Reissued Jan. 7, 1936 Re. 19,804

UNITED STATES PATENT OFFICE 19,804

TREATMENT OF MOTOR FUEL

Wayne L. Benedict, Chicago, Ill., assignor to Universal Oil Products Company, Chicago, Ill., a corporation of Delaware No Drawing. Original No. 2,014,923, dated September 17, 1935, Serial No. 711,555, February 16, 1934. Application for reissue November 21, 1935, Serial No. 50,923

16 Claims. (Cl. 44—9)

This invention relates more particularly to treatment of gasoline fractions produced in cracking the heavier and less valuable portions of petroleum and other similar materials though it is also applicable to the treatment of corresponding straight run fractions.

In a more specific sense the invention is concerned with the preservation of valuable properties of either raw or treated gasolines under the usual conditions of storage during which the gasolines are exposed to the influence of light and oxygen in varying degrees.

Cracked motor fuel fractions which have not been subjected to refining treatments stand generally in contrast to straight run gasolines in several respects. They frequently have a higher sulphur content which accounts principally for their unpleasant odor and they are subject to rapid deterioration on standing due to polymerization and condensation reactions among the various types of olefins which constitute a substantial percentage of the hydrocarbons which go to make up their total composition. To offset some of these disadvantages the cracked products have a uniformly higher knock rating than straight run products, though this may also depreciate to some extent along with the loss of color and the development of gums which usually occur simultaneously though not necessarily so.

In rendering gasolines sufficiently stable to permit their storage over reasonable periods of time two general courses of action are open, the first consisting in treating out the offending constituents by means of chemicals and by polymerization reactions induced by condensing agents and various solid contact materials and the second consisting in using small quantities of antioxidants or inhibitors to stabilize the more reactive di and tri olefins and render them less readily polymerized under the influence of oxygen. It is with processes of the latter character involving the use of a particular class of composite inhibiting materials that the present invention is concerned.

The deterioration of gasoline, particularly cracked gasolines, after a certain period of storage, is evidenced generally by the development of a perceptible color or haze as a matter of direct observation and by an increase in the gum or resin content and a loss in anti-knock properties as determined by evaporation tests and engine runs respectively. These changes involve only a very small percentage of the total constituents of the gasoline and it is difficult to follow their course without using analytical and test methods of an unusual degree of refinement. The types of compounds responsible for the changes vary with the charging stock originally cracked and the severity of the conditions of cracking so that the actual steps in the deterioration in respect to color, translucency, gum content and anti-knock value may take place in different order and in varying degree in different cases. In the case of gasolines which have had light chemical treatments such as treatment with sulphuric acid, caustic soda, plumbite solutions, etc., the changes among the minor quantities of unstable components may be further complicated by the presence of chemical reaction products such as sulphuric acid esters, organic disulfides, etc., so that altogether the course of the different reactions leading to the deterioration of properties may have many diverse aspects.

To offset and retard the undesirable changes in gasolines under storage conditions without severe chemical treatments entailing high losses, the art of using very small amounts of the so-called "inhibitors" has been developed to a considerable extent. While the inhibiting action of many compounds and mixtures of compounds is frequently explainable on a basis of a preferential affinity of the inhibitor for oxygen which prevents the attachment thereof to unstable hydrocarbons and the consequent development of gums and colored bodies, other compounds which are not of such a readily oxidizable character have been found empirically which exert a retarding influence upon some of the reactions, and the mechanism of their action is not so well understood.

The present invention involves the use of a particular inhibiting substance which has the power to retard to an unusual and unexpected extent the various types of changes which take place in unstable gasolines under storage conditions.

In one specific embodiment the present invention comprises the use of compounds formed by the interaction of wood tar fractions and aliphatic amines to substantially retard the development of gums, color and cloudiness and the loss in anti-knock value commonly suffered by cracked gasolines under storage conditions.

We have determined as a result of experiments employing both inhibitors for preventing color and haze formation and those acting principally to prevent gum formation that unexpectedly good results are obtained when using a material which contains the reaction products formed between aliphatic amines and certain constituents of wood tars which are weakly acidic in character. The exact nature of these compounds as they originally occur in the wood tar is not well known and consequently the chemical nature of the compounds formed is also indefinite. When different aliphatic amines are added to wood tar there are indications that chemical reactions take place as evidenced by a small but definite evolution of heat, and the further observation that the inhibiting value of the wood tar fraction in respect to preventing color and gum formation is better than before. It is difficult and impractical to analyze the products of these reactions and little value would be gained thereby so that no attempt is made at this time to explain the observed phenomenon on a strictly chemical basis.

In respect to the wood tars employed as one reacting constituent to unite with aliphatic amines and form the present type of composite inhibitor, it has been previously noted that the relatively heavy, oily or tarry portions of the distillates of wood of different types, particularly hardwoods, are practically always utilizable as a source of inhibiting materials for use in retarding the deterioration of gasolines in storage, particularly in regard to gum formation and loss in anti-knock value, and it has also been determined in the case of a number of woods, that particular boiling range fractions may be selected which have superior value in this respect.

The selection of a wood tar fraction for reaction with aliphatic amines to form compounds useful in preventing the deterioration of any given gasoline on storage will be determined by consideration of a large number of factors. Primarily, the chemical composition of cracked and straight-run gasolines from different sources will vary markedly in respect to the percentages of those classes of compounds which require stabilization by the use of inhibitors. For example, when cracked gasolines are produced under relatively high temperatures and low superatmospheric pressures by processes currently known as "vapor phase" cracking processes, the percentages of di and tri-olefins may be relatively high, resulting in a pronounced tendency toward polymerization with attendant depreciation in value of the gasoline stock. In such cases, more highly efficient wood tar fractions may be used, since in general the observed gum inhibiting power of a fraction which has been reacted with aliphatic amines is of the same relative order as the original unreacted wood tar cut, although considerably accentuated, as will be later shown. When more nearly saturated gasolines are produced from intermediate petroleum distillates of a relatively saturated character and under higher superatmospheric pressures and lower temperatures, either smaller amounts of the more efficient fractions or the same amounts of relatively less efficient fractions may be combined with the amines to form compounds which will effect the required stabilization of properties. In most cases, the proper selection will be readily made by a few experiments and present no unusual difficulties.

It is usually found that the inhibiting value of the compounds passes through a maximum corresponding to some definite boiling point or boiling range in the wood tar and in many instances the best fraction of wood tar to use falls within the approximate boiling range of from 240 to 280° C., though the limits may vary considerably and good fractions are frequently found boiling at points between 220 and 320° C. The use of higher boiling fractions is sometimes limited by the fact that they impart color or cloudiness to gasolines to an undesirable extent. According to the present invention, however, this color and haze effect is materially lessened by the pretreatment of the wood tar fraction with aliphatic amines.

In regard to the compounds which are reacted with wood tar fractions to form inhibitors according to the present process it may be stated that the broad class of aliphatic amines includes all compounds in which the hydrogen atoms of ammonia are partly or completely replaced by alkyl residues. The replacement of one ammonia hydrogen atom, as in the compound ethyl amine, ($C_2H_5NH_2$), forms a series of compounds known as primary amines; replacement of two hydrogen atoms, as in the compound diethyl amine ($(C_2H_5)_2NH$), forms the series of secondary amines and the complete replacement of all three hydrogen atoms, as in the compound triethyl amine ($(C_2H_5)_3N$), forms a series of compounds known as the tertiary amines which are also called nitrile bases to distinguish them from alkyl cyanides or acid nitriles.

The tertiary amines show their alkaline character by forming direct addition compounds with such acids as hydrochloric and picric acids, for example, the hydrochloride of triamylamine has the formula $N(C_5H_{11})_3.HCl$ and the picrate has the formula $C_6H_2.(NO_2)_3.ON.H(C_5H_{11})_3$.

Any of the primary, secondary or tertiary aliphatic amines may be employed in the present connection when they show sufficient reactivity with the wood tar fraction to be employed and when the reaction produces an economical increase in the inhibiting effectiveness. However, the alternate use of various members of the class of aliphatic amines is not to be taken as evidence that they function in an exactly equivalent manner.

The following list shows a number of representatives of the general class of aliphatic amines although it is not intended to be complete but merely indicative of the type of compounds which may be reacted with wood tar fractions to form composite inhibitors of variable inhibiting power.

| | | |
|---|---|---|
| Trimethylamine | Cyclohexylamine | 2 Amino-n-octane |
| Triethylamine | Di-n-butylamine | Tributylamine |
| Diallylamine | Di-iso-butylamine | Diamylamine |
| Tripropylamine | n-heptylamine | Triamylamine |

*Dicaprylamine*

I have determined that, when aliphatic amines of the above character are reacted with wood tar fractions to form compounds whose use in gasoline constitutes the subject matter of the present invention, both the color and the gum inhibiting properties of the compounds thus produced are greater than the sum of those possessed by the equivalent amount of aliphatic amine as a color inhibitor and of the wood tar fraction as a gum inhibitor respectively. The reason for this cooperative action is obscure and probably involved in some way in the chain of reactions which is supposed to occur during the oxidation of the unsaturated hydrocarbons present in gasolines. Obviously a number of alternative composite inhibitors exist due to the variable character of different wood tar fractions employed and to some extent the amount and character of the amine reacted therewith, although the different composites are not exactly equivalent in their inhibiting value.

As to the amount of material necessary to secure effective inhibiting action only general ranges can be given on account of the wide variations in stability of different gasolines but in general the weight of composite material on a basis of the gasoline stabilized will vary from approximately 0.005 to 0.10%.

In regard to haze-forming tendencies in gasolines, it is frequently noted that this occurs in gasolines which contain relatively high percentages of sulphur, particularly dissolved sulphur or organic disulfides such as may be present as a result of plumbite sweetening. The use of the triamylamine-wood tar compounds is found to be particularly effective in preventing haze or cloud-formation in such gasolines.

The following examples are introduced to show the general character of the improved results obtained when utilizing compound inhibitors characteristic of the present invention. While the data are representative they only include four selected examples from a large number of cases, and obviously the scope of the invention is not to be limited to the specific figures shown.

*Example I*

Triamylamine was reacted with a hardwood tar fraction boiling between the approximate range of from 240 to 280° C. Approximately 3 parts of the wood tar fraction was mixed with one part of triamylamine at ordinary temperatures, agitation being used until the reaction was evidently complete as shown by no further evolution of heat. The composite inhibitor thus made was used in a commercial blended gasoline from the mid-continent area consisting of 62.5% of cracked gasoline, 20.5% of straight run gasoline and 17% of absorption gasoline. The data in the following table were obtained by adding small amounts of composite inhibitor to the gasoline and noting the time elapsing before a definite haze was observed when the raw and inhibited samples were exposed to sunlight under standard conditions, the samples being contained in specially selected 8 ounce glass sample bottles.

*Stability tests in the glass bottles*

| Inhibitor | Percent used | Time sample remained clear, minutes | Time to definite haze formation, minutes |
|---|---|---|---|
| None | | 45 | 50 |
| Triamylamine | 0.000125 | 150 | 165 |
| Composite inhibitor [1] | 0.0005 | 195 | 210 |
| Wood tar fraction | 0.05 | 35 | 40 |
| Composite inhibitor [1] | 0.05 | Over 240 | Test stopped |

[1] Made by combining three parts by weight of wood tar fraction with 1 part by weight of triamylamine.

An examination of the above data will show that the use of an amount of the composite inhibitor containing given percentages either of triamylamine and wood tar gave a longer time of freedom from haze when using the equivalent uncombined amounts of either triamylamine or wood tar alone. For instance in Example I, in the second part of the table, even though the weight of reacted wood tar in the composite inhibitor was considerably less than the weight of unreacted fraction used alone in the check or blank test, the time before haze formation was increased to a remarkable extent, to wit, from 35 to 240 minutes. In part I of the same table there is an increase of from 150 to 195 minutes when the given weight of triamylamine is used in combination with 3 times the weight of wood tar fraction, as compared with the use of triamylamine alone.

*Example II*

In further substantiation of the value of using the preceding composite inhibitor, the results obtained on another sample of blended gasoline in which tests were made in quartz bottles exposed to the light of a carbon arc are in point.

| Inhibitor | Percent used | Time sample remained clear, minutes | Haze appeared, minutes | Saybolt color in 30 minutes before filtering | Saybolt color in 30 minutes after filtering |
|---|---|---|---|---|---|
| Wood tar fraction | 0.01 | 2.5 | 7.5 | 15 | 20 |
| Triamylamine | 0.005 | 15 | 17.5 | 20 | +30 |
| Composite inhibitor | 0.015 | 25 | 27.5 | 24 | +30 |

It is again evident that the composite inhibitor made by chemically reacting given proportions of triamylamine and wood tar fractions has greater inhibiting effectiveness than the same amounts of either reacting constituent used separately.

*Example III*

Dicaprylamine was reacted with a hardwood tar fraction boiling between the approximate range of from 240 to 280° C. In this case approximately 2 parts of the wood tar fraction was mixed with 1 part of dicaprylamine at ordinary temperatures, agitation being used until the reaction was evidently complete as shown by no further evolution of heat. The composite inhibitor thus made was used in the same blended gasoline used in Examples I and II. The data in the following table were obtained by adding small amounts of composite inhibitor to the gasoline and noting the time elapsing before a definite haze was observed when the raw and inhibited samples were exposed to an arc light under standard conditions, the samples being contained in specially selected 4 oz. quartz bottles.

*Haze stability tests in quartz bottles*

| Percent dicaprylamine | Percent wood tar fraction | Condition of sample | | |
|---|---|---|---|---|
| | | 15 minutes | 30 minutes | 45 minutes |
| None. | None. | Haze | Very hazy | Cloudy. |
| 0.005 | None. | Clear (30+) | Clear (26) | Very faint haze. |
| None. | 0.01 | Haze | | |
| Composite 0.005 | 0.01 | Clear (26) | Clear (25) | Clear (23) |

*Example IV*

In further substantiation of the value of using the composite inhibitor of Example III, the results obtained on another sample of blended gasoline which tests were made in quartz bottles exposed to the light of a carbon arc are in point. The sample of gasoline employed in the tests consisted of 45% straight run, 45% cracked and 10% natural gasoline, all from the mid-continent producing area. The samples were examined at 2.5 minute intervals.

| Percent dicaprylamine | Percent wood tar fraction | Remained clear (minutes) | Haze appeared (minutes) |
|---|---|---|---|
| None. | None. | | 2.5 |
| None. | 0.01 | | 2.5 |
| 0.001 | None. | 5 | 7.5 |
| Composite 0.001 | 0.01 | 7.5 | 10 |
| 0.0015 | None. | 7.5 | 10 |
| Composite 0.0015 | 0.01 | 10 | 12.5 |
| 0.0021 | None. | 12.5 | 15 |
| Composite 0.0021 | 0.01 | 17.5 | 20 |
| 0.0025 | None. | 12.5 | 15 |
| Composite 0.0025 | 0.01 | 22.5 | 25 |
| 0.003 | None. | 17.5 | 20 |
| Composite 0.003 | 0.01 | 35 | 37.5 |

It is again evident that the composite inhibitors made by chemically reacting given proportions of dicaprylamine and wood tar fractions have greater inhibiting effectiveness than the same amounts of either reacting constituent used separately.

It will be observed by reference to Example III that the addition of 0.01% of wood tar fraction alone had no effect on the haze properties of the blended gasoline. However, when the dicaprylamine was reacted with this portion of the wood tar, the sample remained clear for a longer period of time than even the sample with the dicaprylamine alone since the latter showed a faint haze at the end of 45 min. while the former was still clear though the color had dropped somewhat.

The character and objects of the invention will be apparent to those skilled in the art to which it appertains from a consideration of the foregoing specification and numerical data included therein, although neither section is to be employed in a limiting sense upon the generally broad scope of the invention.

I claim as my invention:

1. A process for the treatment of cracked hydrocarbon oil of substantially gasoline boiling range to prevent deterioration thereof in respect to gum and color formation and depreciation of anti-knock value which comprises, adding thereto a relatively small amount of the reaction product formed by the admixture of a wood tar and an alkyl amine.

2. A process for the treatment of cracked hydrocarbon oil of substantially gasoline boiling range to prevent deterioration thereof in respect to gum and color formation and depreciation of anti-knock value which comprises, adding thereto a relatively small amount of the reaction product formed by the admixture of a wood tar inhibitor and triamylamine.

3. A process for the treatment of cracked hydrocarbon oil of substantially gasoline boiling range to prevent deterioration thereof in respect to gum and color formation and depreciation of anti-knock value which comprises, adding to the cracked hydrocarbon oil a relatively small amount of the reaction product formed by the admixture of a hard wood tar distillate boiling about 220° C. and below 300° C. and an alkyl amine.

4. A process for the treatment of cracked hydrocarbon oil of substantially gasoline boiling range to prevent deterioration thereof in respect to gum and color formation and depreciation of anti-knock value which comprises, adding to the cracked hydrocarbon oil a relatively small amount of the reaction product formed by the admixture of a hard wood tar distillate boiling above 220° C. and below 300° C. and a trialkyl amine.

5. A process for the treatment of cracked hydrocarbon oil of substantially gasoline boiling range to prevent deterioration thereof in respect to gum and color formation and depreciation of anti-knock value which comprises, adding to the cracked hydrocarbon oil a relatively small amount of the reaction product formed by the admixture of a hard wood tar distillate boiling above 220° C. and below 300° C. and triamylamine.

6. Motor fuel comprising cracked gasoline containing a relatively small amount of the reaction product formed by the admixture of a wood tar inhibitor and an alkyl amine.

7. Motor fuel comprising cracked gasoline containing a relatively small amount of the reaction product formed by the admixture of a wood tar inhibitor and triamylamine.

8. Motor fuel comprising cracked gasoline containing a relatively small amount of the reaction product formed by the admixture of a hard wood tar distillate boiling above 220° C. and below 300° C. and an alkyl amine.

9. Motor fuel comprising cracked gasoline containing a relatively small amount of the reaction product formed by the admixture of a hard wood tar distillate boiling above 220° C. and below 300° C. and a trialkyl amine.

10. Motor fuel comprising cracked gasoline containing a relatively small amount of the reaction product formed by the admixture of a hard wood tar distillate boiling above 220° C. and below 300° C. and triamylamine.

11. A stabilizing agent comprising the reaction product formed by the admixture of a wood tar inhibitor and an aliphatic amine.

12. An inhibitor comprising the reaction product formed by the admixture of triamylamine and a hard wood tar distillate boiling between 220° C. and 300° C.

13. The method of stabilizing gasoline normally tending to deteriorate by oxidation during storage which comprises incorporating into the gasoline a relatively small amount of the reaction product formed by the admixture of a wood tar inhibitor and an aliphatic amine.

14. Motor fuel comprising gasoline which tends to deteriorate by oxidation during storage and stabilized against such deterioration by the incorporation thereinto of a relatively small amount of the reaction product formed by the admixture of a wood tar inhibitor and an aliphatic amine.

15. The method of improving wood tar inhibitor which comprises adding an aliphatic amine thereto and reacting the same with components of the wood tar inhibitor.

16. The method of improving the inhibiting properties of hard wood tar distillate which comprises adding triamylamine thereto and reacting the same with components of the distillate.

WAYNE L. BENEDICT.